May 18, 1954
E. NEWTON
2,678,598
FUME DISPERSING DEVICE AND THE LIKE
Filed June 1, 1951
2 Sheets-Sheet 1
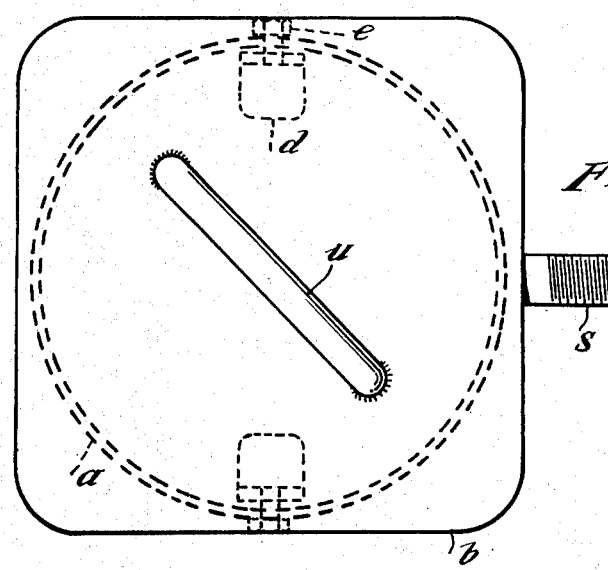
Fig.1.
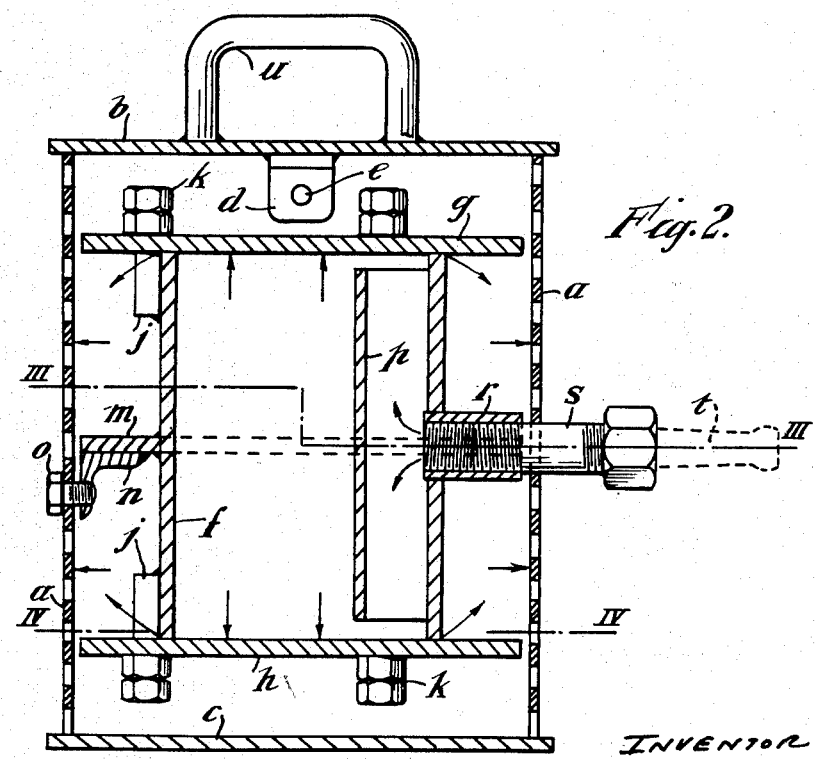
Fig.2.
INVENTOR
EDMUND NEWTON
By:
AGENTS May 18, 1954 E. NEWTON 2,678,598
FUME DISPERSING DEVICE AND THE LIKE
Filed June 1, 1951 2 Sheets-Sheet 2

INVENTOR
EDMUND NEWTON

Patented May 18, 1954

2,678,598

UNITED STATES PATENT OFFICE 2,678,598

FUME DISPERSING DEVICE AND THE LIKE

Edmund Newton, Thornaby-on-Tees, England, assignor to Furness Shipbuilding Company Limited, Billingham, England, a company of Great Britain and Northern Ireland Application June 1, 1951, Serial No. 229,305

Claims priority, application Great Britain June 6, 1950

5 Claims. (Cl. 98—40)

This invention relates to fume dispersing devices and the like, the object being to provide improvements therein.

According to this invention, a fume dispersing device or the like is provided with a totally enclosed chamber, one or more of the closure members of said chamber providing a mechanical closure thereto but not an air-tight closure whereby air or other gas supplied to said chamber can escape therefrom when under pressure, said chamber being also provided with connecting means for supplying thereto air or other gas under compression.

Figure 3:
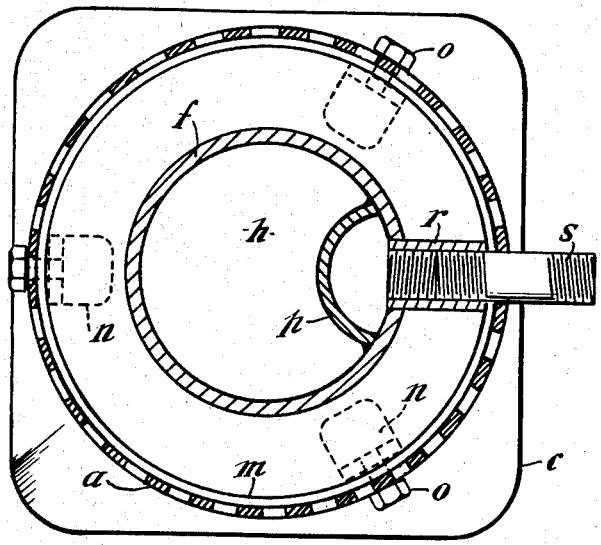
Figure 4:
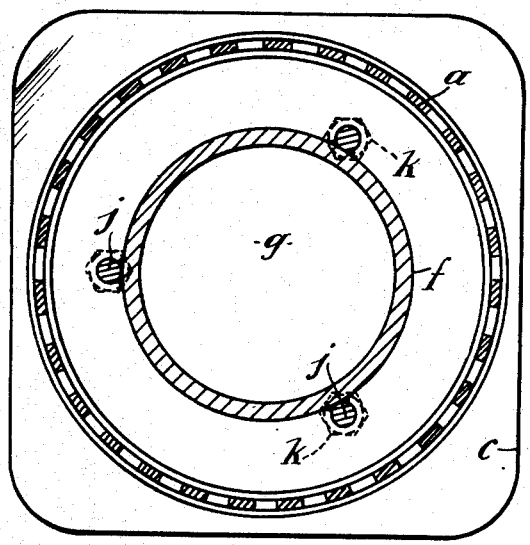

The accompanying drawings illustrate, by way of example, one construction of fume dispersing device in accordance with our invention. In the drawings Figure 1 is a plan view, Figure 2 is a central vertical section, and Figures 3 and 4 are plan sections on the lines III—III and IV—IV respectively in Fig. 2.

Referring to the drawings, in the example therein illustrated, an outer chamber is provided by a cylindrical tubular member $a$ having its ends closed by plates $b$, $c$ which make a substantially complete mechanical closure thereof. Lugs $d$ are secured by welding or otherwise suitably to the top plate $b$ and provide means for securing it to the tubular member $a$ by means of studs or bolts $e$ passed through the lugs and the member. The bottom plate $c$ is welded to the lower end of the member $a$. The wall of the tubular member is perforated with numerous holes of comparatively small area. If desired the top plate $b$ may be similarly perforated.

A medial chamber is provided comprising a cylindrical tubular member $f$ provided at its ends with disc closure members $g$, $h$ of substantially larger diameter than the outer diameter of the tube $f$ so that, when applied thereto, they provide external flanges around the tube ends. Angularly spaced screw bolts $j$ are secured by welding their shanks to the exterior of the tube $f$ at each end, said shanks being parallel to the axis of the tube and their screw-threaded portions projecting from its ends. The bolts are passed through holes in the discs $g$, $h$ whereby they may be secured in facial contact with the tube ends by means of nuts and lock nuts $k$. The discs $g$, $h$ provide mechanical closures to the chamber formed inside the tubular member $f$ but, as the contacting surfaces are not machined, they do not provide air-tight closures.

An annular plate $m$ is disposed externally around the tubular member $f$ medially of the ends of said member, and its inner edge is welded to said member so that it forms a diaphragm around its waist.

The construction forming the medial chamber and comprising the tubular member $f$, the disc enclosures $g$, $h$ and the diaphragm $m$, is disposed within the outer chamber $a$ and is secured therein medially of the ends of said chamber and coaxially therewith by means of lugs $n$ welded to the underside of the diaphragm and attached by screw studs $o$ passing through holes in said lugs and in the cylindrical wall of the outer chamber. The medial chamber construction is secured within the outer chamber $a$ to form annular portions of said chamber between the walls $a$ and $f$, and with the end closure discs $g$, $h$ axially spaced from the end plates $b$, $c$ of the outer chamber. The discs $g$, $h$ may be of the same diameter as the internal diameter of the tubular member $a$, in which case their projecting portions may be perforated to allow circulation of gas or air between the annular portions of the outer chamber and the end portions of said chamber. As shown however the discs $g$, $h$ are of slightly less diameter than the internal diameter of the tube $a$ so that a narrow annular space is left between their edges and said tube for the circulation of gas or air.

An inner chamber $p$ is provided formed by a channel member of arcuate section which is secured within and longitudinally of the tubular member $f$ by welding its longitudinal edges to the inner surface of said tube. The transverse depth of the channel member $p$ is substantially less than the radius of the tube $f$ so that said inner chamber is located adjacent to the wall of the tube and on one side of the axis. The ends of the channel member $p$ are spaced from the discs $g$, $h$ of the medial chamber so that there may be free circulation of gas or air between the inner chamber $p$ and the medial chamber $f$. Radially aligned holes are provided in the walls of the tubular members $f$ and $a$, one hole in each member, the hole in the tube $f$ being in that portion thereof which forms part of the wall of the inner chamber $p$. Conveniently the axis of the holes is in the medial plane of the diaphragm plate $m$, and a tubular socket or ferrule $r$ is disposed within the annular portion of the outer chamber $a$ with one end in facial contact with the inner surface of the tube $f$, said ferrule being welded to the edges of a radial slot provided in the diaphragm $m$.

The ferrule $r$ is screw-threaded internally and an externally screw-threaded nipple $s$ is passed through the hole in the wall of the outer chamber $a$ and screwed into the ferrule. A hose or other pipe line connection $t$ is screwed onto the outer end of the nipple.

A loop or other handle $u$ is welded to the upper end plate $b$ of the outer chamber, the end plate $c$ forming a bottom for standing the device on the ground or other supporting surface.

In use, our fume dispersing device is placed in a room or other enclosed or confined space containing fumes, gases, smoke or other form of polluted atmosphere, and is connected by the nipple $s$ and connection $t$ to a source of compressed air, which air is taken from the atmosphere and compressed by mechanical means not shown, or other suitable gas under pressure. The compressed air is led thereby directly into the inner chamber $p$, whence it passes through both ends thereof into the medial chamber $f$. Some of the pressure air escapes from the medial chamber through the joints between its wall and the end closure discs $g$, $h$, and as the pressure in the chamber increases, the discs are forced slightly off the ends of the tubular member $f$ to allow more of the pressure air to escape from the medial chamber into the outer chamber $a$, as indicated by the arrows in Fig. 2. It will be observed that the end discs $g$, $h$ are in no way connected to the perforated wall of the outer chamber $a$, and that the resistance of the discs to the bulging effect of the pressure air in the chamber $f$ depends only on the number of bolts $j$ and nuts $k$. The nuts are tightened-up on the bolts so as to press the discs hard against the ends of the chamber $f$ thereby allowing the discs to yield only under considerable pressure. The pressure air is further diffused by its passage through the perforations in the wall of the outer chamber $a$ into the surrounding polluted atmosphere, the fumes or the like being driven by said air out of the room or other space.

When in use, our device is almost noiseless, its construction being such as to eliminate the loud noise which is normally caused by the escape of a considerable volume of pressure air from an open-ended pipe such as $r$. It will be appreciated that this is an important advantage as it is not possible for men to work for long periods when subjected to a continuous high-pitched noise. Moreover, the perforated tubular member $a$ also affords adequate physical protection to the medial chamber $f$ and its end discs $g$, $h$ which would otherwise be liable to distortion, if roughly handled.

The primary purpose of the device of the present invention is to supply fresh air to a confined space laden with fumes or the like detrimental to persons occupying the space. When in operation the device acts to expel, via the normal entry or exit, to or from the space, any bad air, fumes or the like. To effectively expel such bad air, it is necessary to supply the space with air under pressure. However, as workmen will, in all probability, be working in the space, the supply of fresh compressed air directed from a pipe or nozzle, would be a source of danger and discomfort for the workmen. Therefore, it is necessary to diffuse or "break up" the air supplied under pressure. The small diameter hose, by which the compressed air is supplied to the device, can be easily passed through a small size orifice leading to the space; for example, through a man-hole, without obstructing the outward flow of bad air from the space. The apparatus of the present invention has no effect on the compressed air other than to diffuse it and actually is not required to have any other effect.

Our fume dispersing device is very suitable for use in the compartments and confined spaces of ships and other vessels under construction or repair where smoke and fumes are liable to accumulate. It is also very suitable for use in confined spaces in vessels when on service, and in any other confined or enclosed space where circumstances require the dispersal of smoke, fumes or the like. Being of small size and light weight, the device can be handled easily and can be passed through a small access man-hole or other opening. Two or more devices may be used simultaneously in one polluted space, according to the size of said space. There are no mechanical parts to receive attention, and the device is readily adaptable for a connection to any standard pneumatic system.

What I claim and desire to secure by Letters Patent is:

1. A fume dispersing device or the like, comprising a first chamber having one or more closure members which provide a mechanical closure thereto but not an air-tight closure whereby air or other gas supplied to said chamber can escape therefrom when under pressure, said chamber having a cylindrical tubular member provided at each end with a disc closure member which is of substantially larger diameter than the outer diameter of said tubular member, said disc closure members being secured in facial contact with the ends of the tubular member by angularly spaced screw bolts and nuts, means supporting said first chamber to retain said closure members free of external contact and means being provided for supplying to the chamber air under compression.

2. A fume dispersing device or the like as claimed in claim 1, comprising an outer chamber within which said first chamber is wholly disposed, means supporting first said chamber within said outer chamber with the walls of said first chamber in spaced relation to the walls of said outer chamber, said outer chamber having at least one wall perforated to allow passage of air therefrom to atmosphere.

3. A fume dispersing device or the like as claimed in claim 2, wherein a channel member is wholly disposed within said first chamber and is in free communication therewith and with the means for supplying thereto air under compression.

4. A fume dispersing device or the like as claimed in claim 2, wherein first chamber is provided externally thereof and between said end closure members with a flange which provides a diaphragm within said outer chamber and secured to said outer chamber.

5. A fume dispersing device or the like as set forth in claim 3 wherein said channel member is of arcuate section and disposed within and longitudinal of said first chamber and secured by its free edges to a wall of said first chamber.

References Cited in the file of this patent

FOREIGN PATENTS

| Number | Country | Date |
|---|---|---|
| 344,264 | Great Britain | Mar. 5, 1931 |
| 868,218 | France | Sept. 22, 1941 |